V. C. YOUNG.
AUTOMOBILE RADIATOR CONNECTION.
APPLICATION FILED JAN. 13, 1919.

1,319,745.

Patented Oct. 28, 1919.

Inventor
Vinton C. Young
By
Attorney

UNITED STATES PATENT OFFICE.

VINTON C. YOUNG, OF VERONA, MISSOURI.

AUTOMOBILE-RADIATOR CONNECTION.

1,319,745.   Specification of Letters Patent.   Patented Oct. 28, 1919.

Application filed January 13, 1919. Serial No. 270,933.

*To all whom it may concern:*

Be it known that I, VINTON C. YOUNG, a citizen of the United States, residing at Verona, in the county of Lawrence and State of Missouri, have invented certain new and useful Improvements in Automobile-Radiator Connections, of which the following is a specification.

This invention relates to heat exchange, and more especially to devices of the radiator type and to the means for connecting them with an automobile engine.

The primary object of the invention is to do away with all hose and hose couplings.

A secondary object is to provide a connection of such type that the radiator may be removed any time and readily replaced.

Another object is to provide means for permitting of certain adjustability of parts so that the radiator can be placed in any car to which it is adapted, despite variations in the positions of parts.

Other objects will appear in the following specification and claim. In the drawings—

Figure 1:
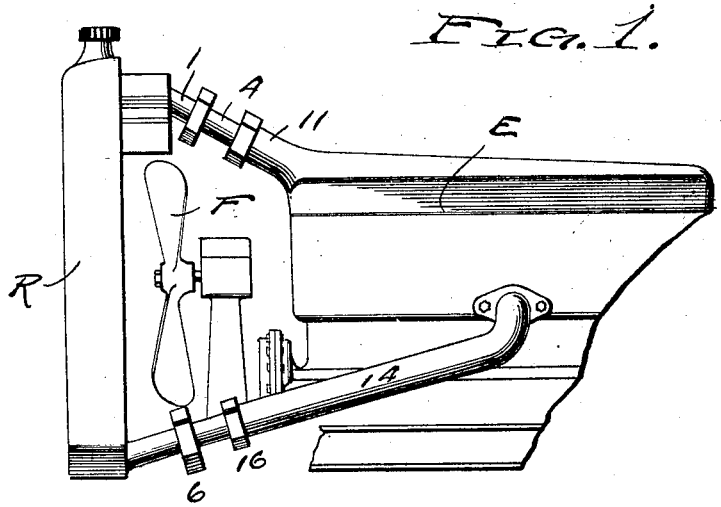
Figure 1 is a side elevation of the forward portion of an engine and the radiator of a well known type of car, showing my improved connection as employed between them.
Figure 2:
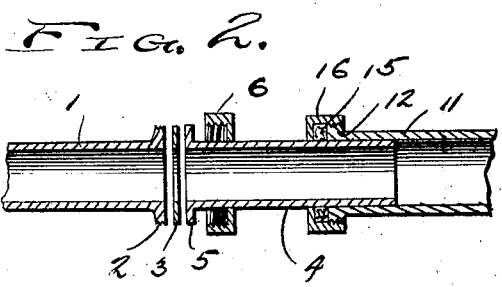
Figs. 2 and 3 are sectional views of the connection only, the first view showing the parts slightly separated and the second view showing them as connected.

We are concerned only with the engine designated at E, the radiator R, and the interposed fan F and in Fig. 1 I have shown these as the parts of a well known type of automobile now in large public use. It is well known that the radiator must be connected with the upper and lower portions of the water jacket within the engine, so that the water will have free circulation through the radiator by which it is cooled and from which it is returned. Hitherto the means for connecting these elements has mostly been by way of hose, and generally rubber hose and appropriate couplings or connections, but I found from experience that almost every time a radiator is removed the hose is so injured that it has to be replaced by a new piece.

Figure 3:
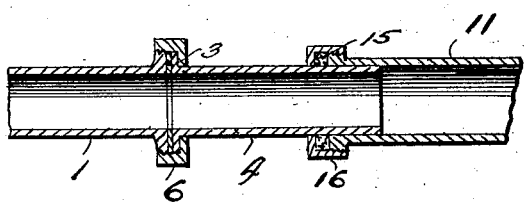

Coming now to the details of the present invention, I provide the radiator near its upper portion with a nipple 1 having at its outer end a threaded flange 2. Adjacent the same is a packing ring or washer 3. A short pipe section 4 has at one end a flange 5 standing next the washer, and a union nut 6 is slidably mounted on the pipe section and internally threaded so it will engage the threads on the edge of the flange 2 when the parts are connected up as seen in Fig. 3.

The other end of the pipe section 4 is slidably mounted in a second nipple 11 which projects from the engine E. This nipple has at its outer end a threaded flange 12 adapted to be engaged by a packing nut 16, suitable packing 15 being interposed. The pipe section 4 is slidably mounted within the nipple 11, whereby an adjustment of parts may be effected, and after adjustment the setting up tight of the nut 16 clamps them in their adjusted position. The specific means for connecting the nipple with the radiator R or the nipple 11 with the engine E is not essential to my invention. The same plan is duplicated at the lower part of the radiator excepting that the lower nipple is continued into quite a long pipe 14.

The supports for the radiator are not shown. A radiator thus provided may be put into the car and connected up with the engine very readily and by a person not necessarily skilled in plumbing connections. I would have the several parts 1, 4 and 11 straight so that no leakage will occur between them and so that the pipe section may be slidable within the nipple 11 to bring about the proper adjustment. It might be possible to have several pipe sections 4 of different length as when a radiator is to be put in a car of some other type than that for which it was especially made.

The foregoing description and the drawings have reference to what may be considered the preferred form of my invention. It is to be understood that I may make certain changes in construction and arrangement of parts, materials, dimensions, et cetera, as may prove expedient and fall within the scope of the appended claim.

Having thus fully described my invention, what I claim as new and desire to secure by Letters Patent is:—

In combination with an engine and a radiator, of a plurality of attaching means therefor, each of which consists of a hollow nipple extending from the radiator, and a hollow nipple extending from the engine, the adjacent ends of the nipples having outstanding flanges peripherally threaded, the flanges being spaced apart, a short pipe section having even outer surfaces, the inner surfaces of said nipples being even and unobstructed, said short pipe section having a bearing flange at one end, while the other end thereof is unobstructed, the unobstructed end portion of said short pipe section being receivable and slidable within one of said nipples, a pair of internally threaded oppositely extending nuts, slidable upon said short pipe section, packing carried within one of said nuts, and a packing washer interposed against the flange of said short pipe section, whereby the nuts may be screwed into engagement with the flanges of said nipples thus causing the short pipe section to be held in a set engagement to form a liquid tight connection, as and for the purpose set forth.

In testimony whereof I affix my signature in presence of two witnesses.

VINTON C. YOUNG.

Witnesses:
THOS. H. WILSON,
GEO. G. LAMBETH.

Copies of this patent may be obtained for five cents each, by addressing the "Commissioner of Patents, Washington, D. C."